UNITED STATES PATENT OFFICE.

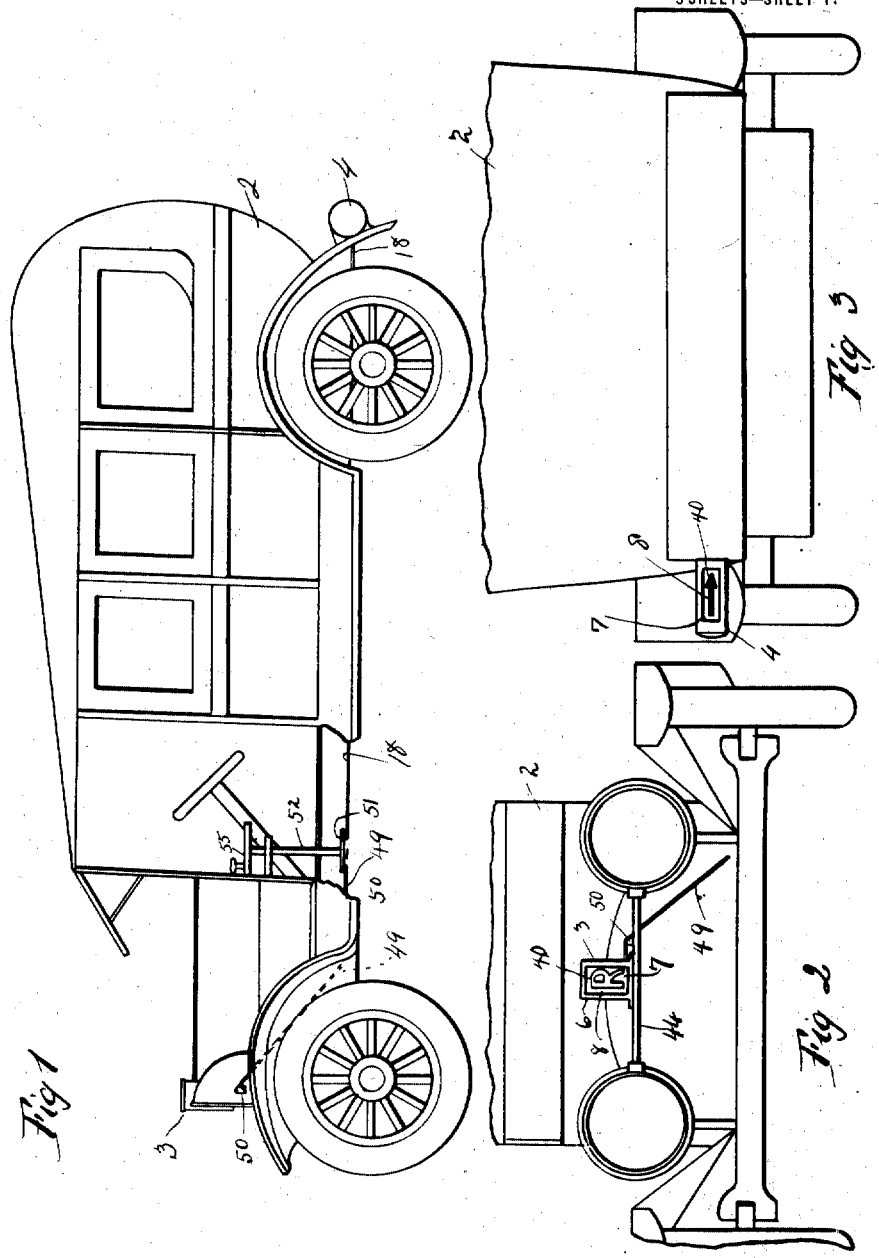

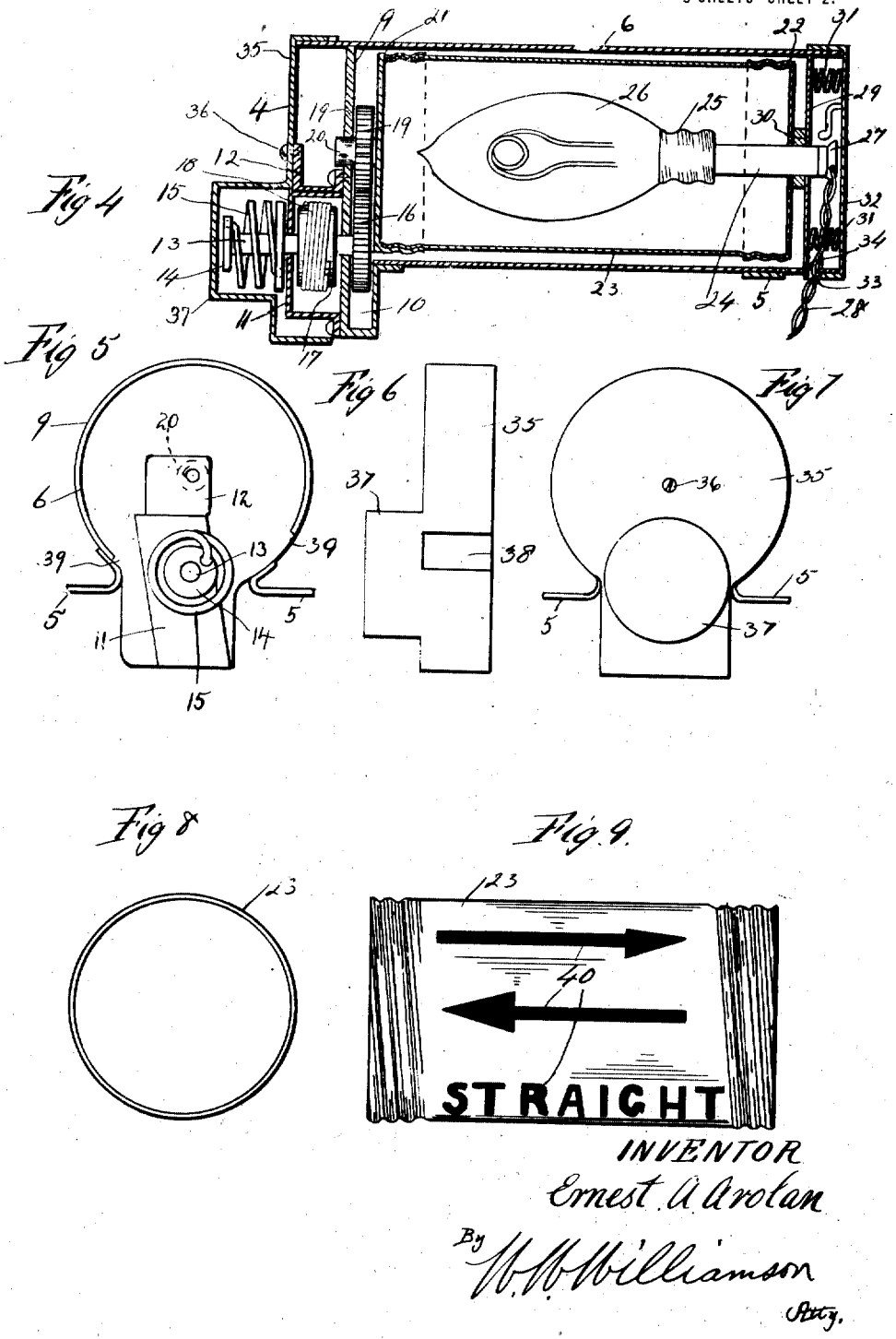

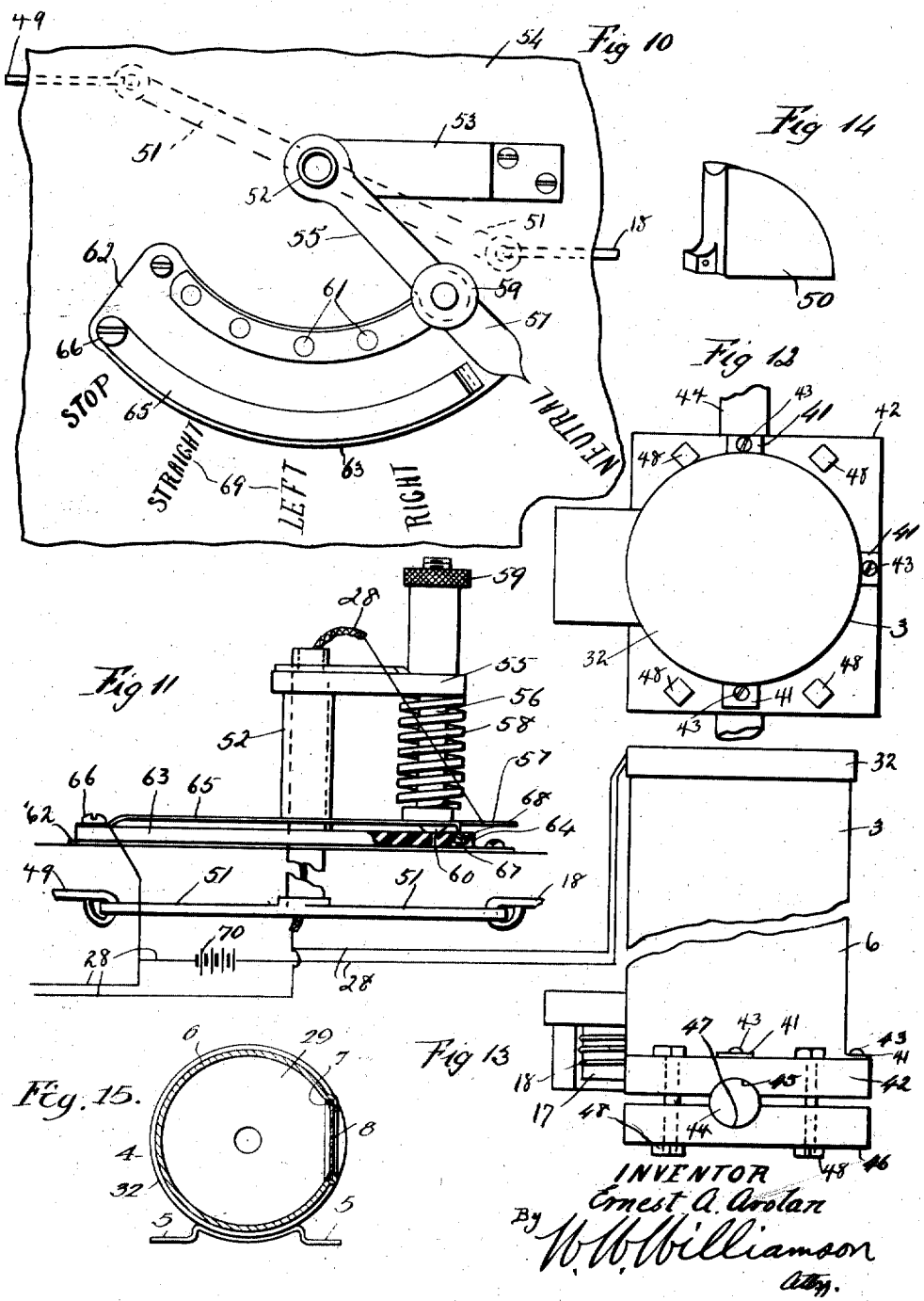

ERNEST A. AROLAN, OF KINGSTON, NEW YORK.

AUTOMOBILE-SIGNAL.

1,277,171.

Specification of Letters Patent.  Patented Aug. 27, 1918.

Application filed July 13, 1917. Serial No. 180,266.

*To all whom it may concern:*

Be it known that I, ERNEST A. AROLAN, a citizen of the United States, residing at Kingston, in the county of Ulster and State of New York, have invented new and useful Improvements in Automobile-Signals, of which the following is a specification.

My invention relates to new and useful improvements in automobile signals and has for its object to provide a device of this character whereby traffic approaching and following a vehicle equipped with my improved signal will be notified of the intentions of the operator or driver.

Another object of my invention is to provide two signal devices, one located at each end of the automobile and means for simultaneously controlling signal indications and the lights in both signal devices.

A further object of the invention is to provide in a signal of the character described, a signal device in the form of a glass cylinder inclosed in a suitable housing and provided with means for rotating said cylinder in one direction and having other means under the control of the operator of a vehicle for rotating said cylinder in the opposite direction.

A still further object of the invention is to provide a controller or controlling switch adapted to rotate the glass cylinders in the signal device, complete the circuit through the lamps in the signal device, indicate the different positions of the cylinders with the indications thereon and hold the said cylinders in any of their different adjusted positions.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application in which—

Figure 1, is a side elevation of an automobile, a portion thereof being broken away indicating the relative positions of the different elements of the signal.

Fig. 2, is a front elevation thereof with the upper part broken away.

Fig. 3, is a rear view of the automobile with the upper portion broken away.

Fig. 4, is a longitudinal vertical sectional view of one of the signal devices.

Fig. 5, is an end view thereof with the cap removed.

Fig. 6, is a side elevation of the cap.

Fig. 7, is an end view of the signal device.

Fig. 8, is an end view of one of the glass cylinders.

Fig. 9, is a side elevation thereof.

Fig. 10, is a plan view of the controller or controlling switch.

Fig. 11, is a side elevation thereof, a portion being broken away, and the insulation shown in section to clearly illustrate the construction.

Fig. 12, is a plan view of the other signal device.

Fig. 13, is a side elevation thereof.

Fig. 14, is a perspective view of one of the cable guides or angle members.

Fig. 15, is a transverse sectional view of the housing of one of the signal devices.

In carrying out my invention as here embodied, 2 represents a vehicle here shown as an automobile and to some convenient part of the front end is secured one of the signal devices 3 while to some convenient part of the rear end thereof is secured another signal device 4. The signal device 4 is preferably attached to one of the mud guards in a horizontal position by means of attaching ears or lugs 5 carried by the housing 6 which is open at both ends and provided with a sight opening 7 having suitable transparent material such as a sheet of glass 8 disposed across the same.

Adjacent one end of the housing is located a partition 9 which projects below the lower portion of the housing and forms one of the walls of the gear casing 10, and to the outer face of this partition is secured a suitable bracket 11 carrying an upwardly projecting lug 12. In the partition and the bracket 11 is journaled a shaft 13 carrying an enlargement 14 at its outer end to which is attached one end of the coil spring 15, the other end of said spring being attached to the bracket 11 so that when the shaft 13 is revolved in one direction, the spring will be wound up to revolve said shaft in the opposite direction when the pressure on said shaft is removed. The inner end of the shaft projects through the partition 9 and has fast thereon a gear 16 partly located in the gear casing 10 and partly in the housing of the signal device. On the shaft 13 between the bracket and partition is secured a cable drum 17 about which is coiled a cable 18 having one end made fast to the cable drum with its other end fastened to the controller as will be hereinafter more fully described. The gear 16 meshes with another gear 19 fast on the trunnion 20 which is carried by the end cover 21 and journaled in the partition 9. The end cover 21 and a cylinder end cover 22 are threaded on the ends of the glass cylinder 23 and the end cover 22 is provided with a trunnion 24 which projects into the glass cylinder 23 and is provided with a socket 25 for the reception of the electric light bulb 26. The trunnion 24 also acts as one of the members of the electrical connection with the electric light bulb, and another or plug member 27 is detachably connected thereto and to this plug member are attached the wires 28 which supply the current from a suitable source of electricity to the lamp. The trunnion 24 is journaled in the removable partition 29 located adjacent the opposite end of the housing, the same being spaced from the end cover 22 by a suitable spacing washer 30 and this removable partition is snugly held in position or normally forced inward by means of springs 31 secured to the cap 32 mounted on one end of the housing 6, the latter being attached in any desirable and well known manner as by lock bayonet slots, and this cap is provided with an opening 33 in its flange adapted to aline with an opening 34 in the housing 6, so as to form a passageway for the wire 28. On the opposite end of the housing is placed a cap 35 held in place by a screw 36 passing through said cap and threaded into the lug 12. This cap is provided with an offset 37 so as to provide a chamber for the spring 15 and the outer end of the shaft 13 and also as a slot 38 formed therein for the free passage of the cable 18 and this slot alines with a portion of the cutaway part at one end of the housing as indicated by 39. On the glass cylinder 23 are a number of indication marks 40 consisting of words, letters, arrows or other suitable marks which indicate the intentions of the operator of the vehicle as for instance, an arrow pointing to the right, indicates that the vehicle is to be turned to the right, an arrow pointing to the left indicates that the vehicle is to be turned to the left, the letter S or the word "Stop" indicates that the vehicle is to be stopped and so on.

The other signal device 3 is identical in construction with the signal device 4 with the exception that the attaching ears or lugs 41 are carried by one end of the housing 6 so that when the signal device is attached to the vehicle, it is in a horizontal instead of a vertical position, and the cap 35 is entirely eliminated. To the attaching ears or lugs 41 is secured a plate 42 by suitable attaching means, such as screws 43, and this plate is adapted to be bolted to some suitable portion of the vehicle at the front end thereof, as for instance, the distance rod 44 between the head lights, and although I do not wish to be limited to the exact means or way of fastening the plate 42, I have shown one construction in which said plate is provided with a groove 45 and having another or coacting plate 46 provided with a similar groove 47, the two plates being fastened together about the distance rod which registers with the grooves by means of bolts 48 passing through both plates so that said plates act as a clamp.

From this signal device 3 runs a cable 49, similar to the cable 18, both cables being guided by grooved guide or angle members 50 attached to different parts of the vehicle and located wherever it is necessary to change the course of the cable, one of said guide members being plainly shown in Fig. 14.

One end of each of the cables 18 and 49 is secured to the outer or free ends of the oppositely projecting arms 51 carried by the lower end of the hollow post 52 which is journaled in a suitable bracket 53 secured to some suitable portion of the automobile, such as the floor 54 thereof with the lower end of said post 52 projecting through the floor so that the arms 51 and the ends of the cables attached thereto are entirely out of sight. On said post 52 adjacent its upper end is mounted a crank or handle 55 in which is slidably mounted the shank 56 of the contact shoe 57, said shoe being normally forced downward by a spring 58 coiled about the shank 56 with one end engaging the handle 55 as the stationary member and the other end engaging the contact shoe 57 as the movable member. On the other end of the shank 56 is threaded a nut 59 whereby the shoe 57 may be adjusted and the tension of the spring 58 regulated. The lower end of the shank 56 or the contact shoe is provided with a nose 60 arranged to register with any one of a number of indentations 61 in a plate 62 secured to the floor of the automobile, and to this plate is secured two strips of insulation material 63 and 64, said strips of material being spaced apart a slight distance at their meeting ends so that when the contact shoe 57 overlies the strip of insulation material 64, said shoe is in neutral position. Overlying the other strip of material 63 and having one end secured thereto is a spring contact 65 being fastened at one end as by a screw 66, while the other end of said spring contact member is bent downward and outward to form a tongue 67 which registers with a slot 68 in the strip of insulation material 64, thereby permitting the spring contact member 65 to move up and down within certain limits without becoming accidentally displaced.

If found desirable, the different positions of the glass cylinders or the indications of the signals may be designated by suitable indication devices 69, such as words describing the different movements being made or to be made by the vehicle, and one of these indication devices is opposite each one of the indentations 61. The controller or controlling switch consists of the arms 51, the post to which they are connected, the handle 55, the contact shoe 57, the plate 62 having the indentations 61 therein and the spring contact 65. The contact shoe 57, the spring contact 65, and the lamps in the signal are all electrically connected as by wires 28 with the source of electrical energy 70, so that when the contact shoe 57 engages the spring contact 65, the work is completed through the electric light bulbs in both the signals so that the indications may be readily noted by persons approaching or following a vehicle equipped with my improved signals.

The operation of the device is as follows:

When a person driving a vehicle equipped with my improved signal approaches a street crossing or any other locality on a roadway where it is desirable to indicate to approaching or following traffic the intentions of the driver, and if said intentions are to proceed straight ahead, the handle 55 of the controller is turned until the contact shoe which also acts as a pointer reaches the proper indication device 69, such as the word, "Straight" at which time the nose 60 will register with one of the indentations 61 indicating to the driver that the proper point has been reached and the handle contact shoe 57 and the arms 51 will be temporarily held in this position. In operating the controller as before described, the contact shoe 57 engages the spring contact 65 and completes the electrical circuit through the lamps 26 in the signal device, thus lighting up said signal device, and this movement also changes the positions of the arms 51 which unwind the cables from the cable drums 17 in the signal devices, which unwinding of the cables rotates the cable drums and likewise the shaft 13 in each signal device, thereby transmitting rotary motion through the gears 16 and 19 and the glass cylinder 23 which will move the proper indication mark 40 on said glass cylinder into alinement with the sight opening 7 in the housing so that said indication mark may be readily seen by approaching and following traffic and as the indication marks will be identical or the meaning the same in each signal device, all other traffic on the roadway will know exactly the intentions of the driver of the vehicle.

During unwinding of the cables from the cable drums 17, the springs 15 in each signal device will be wound up so that when the pressure is released from the handle 55 of the controller or said handle returned to the neutral position as indicated in Fig. 10, then the springs 15 will unwind and return the glass cylinders to the neutral or clear position. If the controller is turned to the position indicated by the word "Right" then the glass cylinders are moved as hereinbefore described until the proper designation marks, such as an arrow pointing to the right on the rear signal device and the letter "R" on the front signal device as moved into alinement with the sight opening in the casing where said designation marks may be readily noted, and at the same time the electrical circuit will be completed so that in case of darkness, the signal indications may be read, during the time the electric current may be shut off in any suitable and well known manner so as not to be used during the periods when it is absolutely unnecessary.

Of course, I do not wish to be limited to the exact details of construction as herein shown as these may be varied within the limits of the appended claims without departing from the spirit of my invention.

Having thus fully described my invention, what I claim as new and patentable is—

1. In a device of the character stated, a housing open at each end and provided with a sight opening, a sheet of transparent material disposed across said sight opening, a gear casing at one end of the housing, a permanent partition located adjacent one end of the housing and forming one of the walls of the gear casing, a bracket secured to the permanent partition, a shaft journaled in the bracket and permanent partition and projecting through said partition into the interior of the housing, a spring secured to the shaft and bracket for normally forcing said shaft in one direction, a cable drum fast on said shaft, a gear also fast on the inner end of said shaft, a transparent cylinder within the housing, said cylinder having designation marks thereon adapted to be sighted through the sight opening in the housing, an end cover detachably mounted on each end of the cylinder, a trunnion on each end cover, one of which projects into the cylinder, a gear carried by the other trunnion, a removable partition located at the other end of the housing, said trunnions being journaled in the partitions with the gears in mesh, a washer for spacing the removable partition from the adjacent end cover of the transparent cylinder, a cap for closing that end of the housing where the removable partition is located, springs carried by said cap and engaging the removable partition for normally forcing the latter inward, a source of illumination carried by the trunnion which projects into the cylinder, and attaching means carried by the housing for fastening the same to an object.

2. In a device of the character stated, a housing open at each end and provided with a sight opening, a sheet of transparent material disposed across said sight opening, a gear casing at one end of the housing, a permanent partition located adjacent one end of the housing and forming one of the walls of the gear casing, a bracket secured to the permanent partition, a shaft journaled in the bracket and permanent partition and projecting through said partition into the interior of the housing, a spring secured to the shaft and bracket for normally forcing said shaft in one direction, a cable drum fast on said shaft, a gear also fast on the inner end of said shaft, a transparent cylinder within the housing, said cylinder having designation marks thereon adapted to be sighted through the sight opening in the housing, an end cover detachably mounted on each end of the cylinder, a trunnion on each end cover, one of which projects into the cylinder, a gear carried by the other trunnion, a removable partition located at the other end of the housing, said trunnions being journaled in the partitions with the gears in mesh, a washer for spacing the removable partition from the adjacent end cover of the transparent cylinder, a cap for closing that end of the housing where the removable partition is located, springs carried by said cap and engaging the removable partition for normally forcing the latter inward, a source of illumination carried by the trunnion which projects into the cylinder, another cap for closing the opposite end of the housing, said cap having an offset to provide a chamber for the end of the shaft and the spring thereon and attaching lugs projecting from the housing for fastening the same to an object.

3. A signal comprising a housing having a sight opening therein, a permanent partition within said housing adjacent one end thereof, a removable partition within said housing adjacent the opposite end, a glass cylinder, end covers having threaded engagement with the ends of said cylinder, trunnions carried by said end covers and journaled in the partitions, designation marks on the glass cylinder and a mechanism for rotating the glass cylinder whereby the different designation marks may be moved to the sight opening.

4. A signal comprising a housing having a sight opening therein, a permanent partition within said housing adjacent one end thereof, a removable partition within said housing adjacent the opposite end, a glass cylinder, end covers having threaded engagement with the ends of said cylinder, trunnions carried by said end covers and journaled in the partitions, designation marks on the glass cylinder, a gear fast on one of said trunnions, a bracket, a shaft journaled in said bracket and the permanent partition and having one end projecting through said partition, a gear fast on said shaft and meshing with the first named gear, a drum fast on said shaft, a spring connected to said shaft and the bracket for revolving the shaft in one direction, a cable wound about the drum and means to which the cable is attached whereby the rotary movements of the glass cylinder may be controlled.

5. A signal comprising a housing having a sight opening therein, a permanent partition within said housing adjacent one end thereof, a removable partition within said housing adjacent the opposite end, a glass cylinder, end covers having threaded engagement with the ends of said cylinder, trunnions carried by said end covers and journaled in the partitions, designation marks on the glass cylinder, a gear fast on one of said trunnions, a bracket, a shaft journaled in said bracket and the permanent partition and having one end projecting through said partition, a gear fast on said shaft and meshing with the first named gear, a drum fast on said shaft, a spring connected to said shaft and the bracket for revolving the shaft in one direction, a cable wound about the drum, an electric light bulb located within the glass cylinder means for forming an electric circuit including the electric light bulb and a controller to which the cable is attached for controlling the movements of the glass cylinder, said controller also being in the electrical circuit for making and breaking the same when the glass cylinder is rotated.

In testimony whereof, I have hereunto affixed my signature.

ERNEST A. AROLAN.